Nov. 22, 1960   G. W. LEHMANN   2,960,955
FISHING VESSELS
Filed April 25, 1956
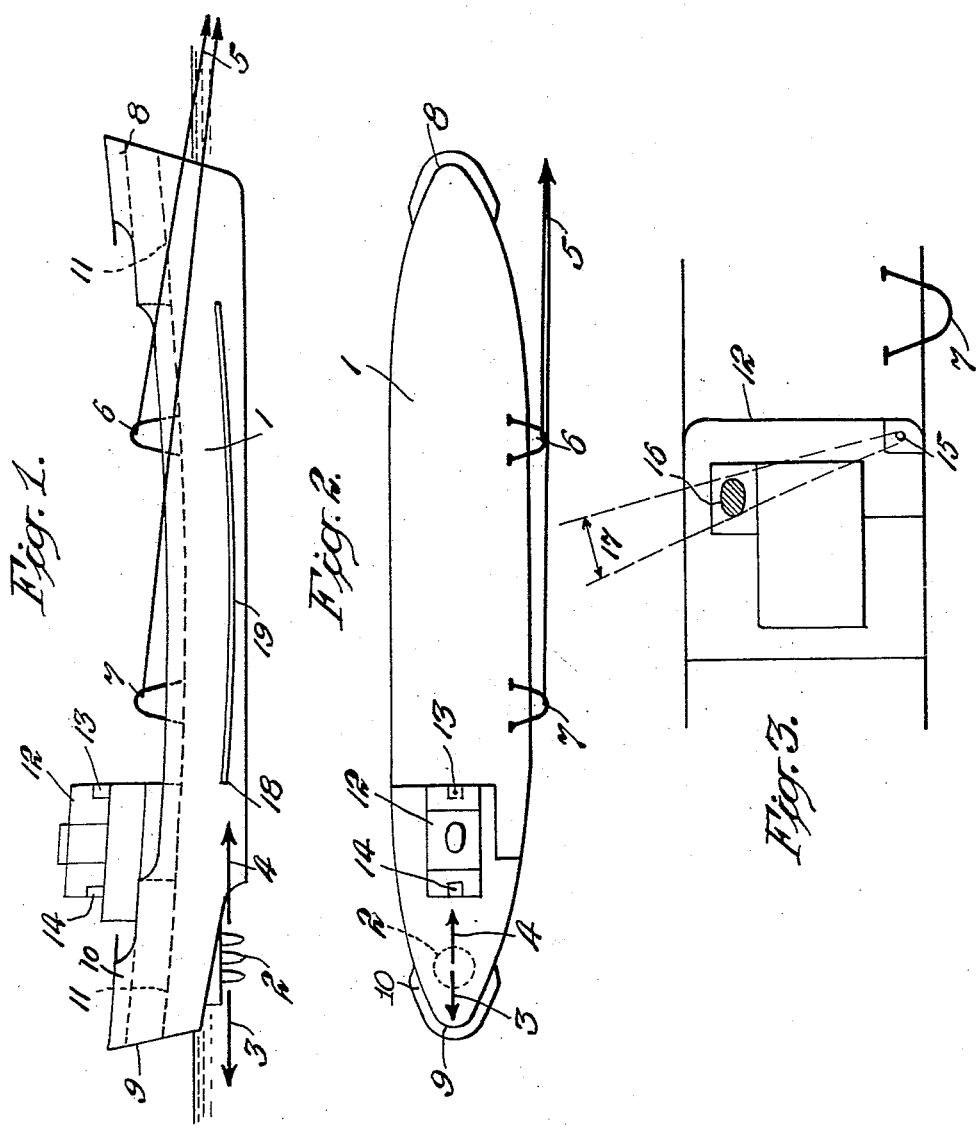
INVENTOR
GUENTHER W. LEHMANN
BY
ATTORNEY

United States Patent Office 2,960,955
Patented Nov. 22, 1960

2,960,955

FISHING VESSELS

Guenther W. Lehmann, 9430 Ridge Blvd.,
Brooklyn 9, N.Y.

Filed Apr. 25, 1956, Ser. No. 580,668

Claims priority, application Germany May 3, 1955

1 Claim. (Cl. 114—.5)

The present invention relates to fishing vessels, and in particular to trawlers which, for the purpose of conducting fishing operations, are required to operate a net generally along the sea bed.

Usually trawlers are fitted with gallows, from which the tow lines extend towards and past the stern of the vessel where the lines and the nets are exposed to potential damage by the propeller and the rudder, this damage being increased when the vessel is operating in an agitated or rough sea.

In order to eliminate the drawbacks of a propeller in close vicinity to netlines and the net it has been already proposed to locate a propeller at the bow of a trawler where the bow propeller is acting as a pulling propulsion means for both operation periods of a trawler, namely, dragging the net at low speed and during cruising with high speed.

The location of a bow propeller, however, does not meet the requirements of a trawler where the propeller has to serve as a propulsion means for dragging and cruising. Trawlers have to travel from the fishing grounds to the home port at highest possible speed in order to land the catch in as fresh condition as possible. The economical outcome of a fishing trip is mainly dependent from the grade of freshness of the catch upon arrival at the home port. A maximum speed while cruising home is therefore imperative for a trawler, and a high speed has to be maintained under all circumstances even in the event of floating ice which is frequently encountered on the routes of fishing boats.

The requirement of maintaining a high speed while cruising and the potential damage of the bow propeller by floating ice render the location of a propeller at the bow to be impracticable, if not even dangerous for a trawler.

With the object of removing the possibility of damage to net and propeller by fouling of the net and net lines with the propeller and to avoid damage to the propeller by floating ice, particularly at high speed under cruising conditions, a trawler according to the present invention is so equipped that one or more propellers are arranged at the stern of a trawler and that for the purpose of conducting a fishing operation it is able to set out, to drag and to haul in the net while proceeding astern, i.e. with the two lines extending from the gallows towards and past the bow using hereby the stern propeller as a pulling propulsion means whereas the stern propeller is acting as a thrust means in the conventional manner under cruising conditions.

Bearing in mind that fishing operations have to be performed in heavy weather, it is desirable that the seasteadiness of the stern of a trawler of the present invention shall be comparable with that of a bow of an ordinary trawler. Accordingly the stern of a trawler of the present invention preferably has substantially the same shape as the forward portion of the hull of an ordinary trawler, that is to say the vessel is designed symmetrically or substantially symmetrically fore and aft, and may be provided with a bulwark at the stern similar to that at the bow.

It will be appreciated that apart from the technical and economical improvements arising from the use of trawlers of the present invention as compared with trawlers which set out and haul in nets while proceeding ahead, the present invention enables nets to be hauled from the leeside of a vessel, thereby increasing maneuverability and appreciably shortening the time for setting out and hauling in the net. It also enables the fishermen to operate with a greater degree of safety than would otherwise be the case where they are compelled to set out and haul in the nets on the weather side of a vessel.

The aft end of the bilge keel, which is the forward end of the vessel hauling while proceeding astern, preferably extends beyond the aft gallow, i.e. the forward gallow while hauling. This facilitates setting out of the nets on the leeside and enables the lines, nets and otter boards to slide along the hull without hooking on any appendages.

It is recognized that the safety of a trawler involves the provision of a complete or substantially complete view from the wheelhouse throughout an angle of 360° and this is particularly the case when a trawler is conducting its fishing operations with other trawlers in the vicinity and similarly operating. At it is desired that a trawler according to the present invention may travel ahead from and to the fishing grounds, and astern during dragging of the net in the fishing operation, a pair of wheelstands may be provided, one forward and one aft.

In certain circumstances, however, such as for example where the invention is applied to trawlers of the kind described and claimed in my Patent No. 2,566,086, wherein the gallows are located at one side only of the vessel, it may be desired to provide a single wheelstand which in such circumstances would preferably be located on that side of the wheelhouse where the gallows operate, in which event conveniently the funnel is placed on the opposite side of the vessel and as forwardly as possible thereof so as to reduce the dead-angle for all-round visibility.

The invention is illustrated by way of example in the accompanying drawing forming part of this specification. It will be appreciated, however, that the invention is not restricted to trawlers fitted with vertical propellers as shown by example, as other types of propellers may be adopted such as for example controllable pitch propellers with rudders.

In this drawing,

Fig. 1 is a diagrammatic side elevation of a trawler with a stern propeller at a bow like shaped stern embodying the invention;

Fig. 2 is a top plan diagrammatic representation of the trawler;

Fig. 3 is a top plan diagrammatic representation of a modification of the wheelhouse.

A trawler 1 is equipped with a stern propeller 2 producing a thrust 3 during cruising ahead and producing a pull 4 during fishing operations. The net lines 5 are run over gallows 6, 7 towards and past the bow while the trawlers 1 is proceeding astern during fishing operations. The stern 9 is equipped with a bulwark 10 similar to the bulwark at the bow 8. The sheer of the after body 11 is the same or substantially the same as the sheer of the forward body. The wheelhouse 12 is equipped with a fore and aft wheelstand 13, 14. In case of a single wheelstand 15 as in Fig. 3 the latter is arranged at the gallow side of the trawler 1. Erections of the bridge and the funnel 16 are located in such a manner that a small dead-angle 17 will be present towards the side contrary to the gallow side of the trawler. The forward end 18 of the bilge keel 19, in the sense of the travelling direction during fishing, is located forward of the gallow 7.

What is claimed is:

Trawler constructed to operate in a manner to keep the nets and drag lines clear of propulsion and steering gear while carrying on fishing operations and to operate at full cruising speed in travel to fishing grounds and return to port and comprising a trawler hull of special conformation having a stern section similar to the bow section rendering the ship navigable and seaworthy for driving astern as well as forward, propeller and steering gear at the stern, reversible for driving the ship astern as well as forwardly, the bow section of the hull being free of projections, a wheelstand for driving the ship astern disposed with clear observation for proceeding astern, a wheelstand for driving the ship forward disposed for clear observation for proceeding forward, forward and aft gallows on the ship's side in the line of vision of the astern driving wheelstand and trawling lines extending from said gallows forward of the ship over the unobstructed bow section for trawling operations and whereby said trawler may be driven forwardly at full cruising speed to the fishing area and there be reversed and the nets put over with the ship in reverse and dragging be carried on while driving the ship astern and nets be taken in in the lee of the unobstructed bow section with the ship lying astern and then with fishing operations completed the reversible propeller and steering gear be reversed to drive the ship forwardly at full cruising speed back to port.

References Cited in the file of this patent

UNITED STATES PATENTS

| | | |
|---|---|---|
| 393,158 | Joyce | Nov. 20, 1888 |
| 538,353 | Schermerhorn | Apr. 30, 1895 |
| 885,370 | Palmer | Apr. 21, 1908 |
| 1,284,767 | Popowicz | Nov. 12, 1918 |
| 2,566,086 | Lehmann | Aug. 28, 1951 |